United States Patent [19]

Brown et al.

[11] Patent Number: 4,635,335
[45] Date of Patent: Jan. 13, 1987

[54] APPARATUS FOR ATTACHING A FLEXIBLE ANNULAR MEMBER TO A RIGID MEMBER

[75] Inventors: Trevor J. Brown, Rochester; James E. Phillips, Clarkston, both of Mich.

[73] Assignee: General Motors Corporation, Detroit, Mich.

[21] Appl. No.: 831,428

[22] Filed: Feb. 20, 1986

[51] Int. Cl.⁴ ............................................. B23P 19/02
[52] U.S. Cl. .................................... 29/235; 29/240; 29/243.5
[58] Field of Search ............... 29/243.5, 240, 238, 29/235, 450, 451, 243.57, 271, 281.4; 157/1.1

[56] References Cited

U.S. PATENT DOCUMENTS

| | | | |
|---|---|---|---|
| 2,574,195 | 11/1951 | Sherrick | 29/235 |
| 4,286,367 | 9/1981 | Geisinger | 29/235 |
| 4,528,736 | 7/1985 | Hope et al. | 29/235 |
| 4,578,851 | 4/1986 | Song | 29/235 |

Primary Examiner—Robert C. Watson
Attorney, Agent, or Firm—R. L. Phillips

[57] ABSTRACT

Apparatus is disclosed for attaching a flexible annular member to a rigid member using an annular tongue on an annular bead on one of the members that is engageable in an annular groove in an annular bead on the other member, and further using a preformed resilient lock ring that is split so as to have oppositely facing ends and has a C-shaped cross-section with a radially outwardly facing peripheral side so as to be mountable over and then clamp together and hold the beads on the members with their tongue and groove engaged.

2 Claims, 4 Drawing Figures

APPARATUS FOR ATTACHING A FLEXIBLE ANNULAR MEMBER TO A RIGID MEMBER

TECHNICAL FIELD

This invention relates to apparatus for attaching a flexible annular member to a rigid member and more particularly to apparatus for making the attachment using beads on the respective members that have a tongue and groove engagement and further using a split lock ring that captures and clamps the beads together to attach the members.

BACKGROUND OF THE INVENTION

In the attachment of a flexible annular member to a rigid member such as that of a so-called "flexible edge" to a wheel cover to make the wheel cover larger in diameter yet deflectable when the tire is severely distorted, it has been common practice to use intermittent attachment such as heat staked projections and a metal band where the rigid wheel cover is plastic and also various forms of clips. In the case of heat staked plastic projections, there are resulting sink marks in the wheel cover along with a substantial space limitation to make the attachment. Furthermore, such an attachment reduces the flex length in the flexible edge. And whether such heat staked projections or separate clips are used, the flexible edge is not attached securely therearound resulting in possible mismatch between the flex edge and the cover at the external or appearance surface.

It is known in general that two rigid members may be attached together at an annular junction thereof by a resilient split ring or band that clamps together beads on these members but it has been found that there is substantial difficulty in actually carrying out such an assembly where one member is flexible because of the lack of inherent support in the latter member for such ring assembly and also because of interferences imposed by the members in the assembly to the application of suitable ring assembly apparatus. Moreover, this problem in assembly is made greater where a tongue and groove engagement between the members is desired to improve their relative locations.

SUMMARY OF THE INVENTION

The apparatus according to the present invention solves these problems and in a cost-effective manner with very simple componentry. The apparatus is particularly adapted to attaching a flexible annular member such as a flexible edge to a rigid member such as a wheel cover using an annular tongue on an annular bead on one of the members that is engageable in an annular groove in an annular bead on the other member and further using a preformed resilient lock ring that is split and is mountable over and then clamps together and holds the annular beads on the members with their tongue and groove engaged. The apparatus comprises a rotary table on which a plurality of support members are annularly arranged and guided for radial movement between a stop position and a radially inwardly located lock ring assembly position. Separate springs normally hold each support member in a stop position and resist radial inward movement to its lock ring assembly position. The flexible edge with the lock ring mounted on the bead thereon is supported on all of the support members while in their stop positions while a locator on each of the support members serves to locate the flexible edge concentric with the rotary table and hold same in a radially outwardly expanded condition so as to centrally receive the wheel cover with radial clearance. A positioning device provides for forcibly positioning the wheel cover so that its bead bears against the bead on the flexible edge while the latter is located and supported in expanded state on the support members. A roller mounted separate from and radially movable relative to the rotary table moves from a retracted position to an extended position operates to engage the lock ring near one of its ends and move same radially inward on the associated support members against their springs. This inward movement forces the one end of the lock ring to snap over the bead on the wheel cover and thus over the bead on both the flexible edge and the wheel cover while also snapping the tongue into the groove on the beads. A drive is then operated to rotate the rotary table while the roller is in its extended position engaging the lock ring to thereby cause the roller to roll along and force the lock ring into position about both the beads along their length to complete the attachment.

DESCRIPTION OF THE PREFERRED EMBODIMENT

These and other objects, advantages and features of the present invention will become more apparent from the following description and drawing in which:

FIG. 2 is an enlarged view similar to the view in FIG. 3 taken along the line 3—3 in FIG. 1 but showing the start of the attachment operation whereas

Figure 1:
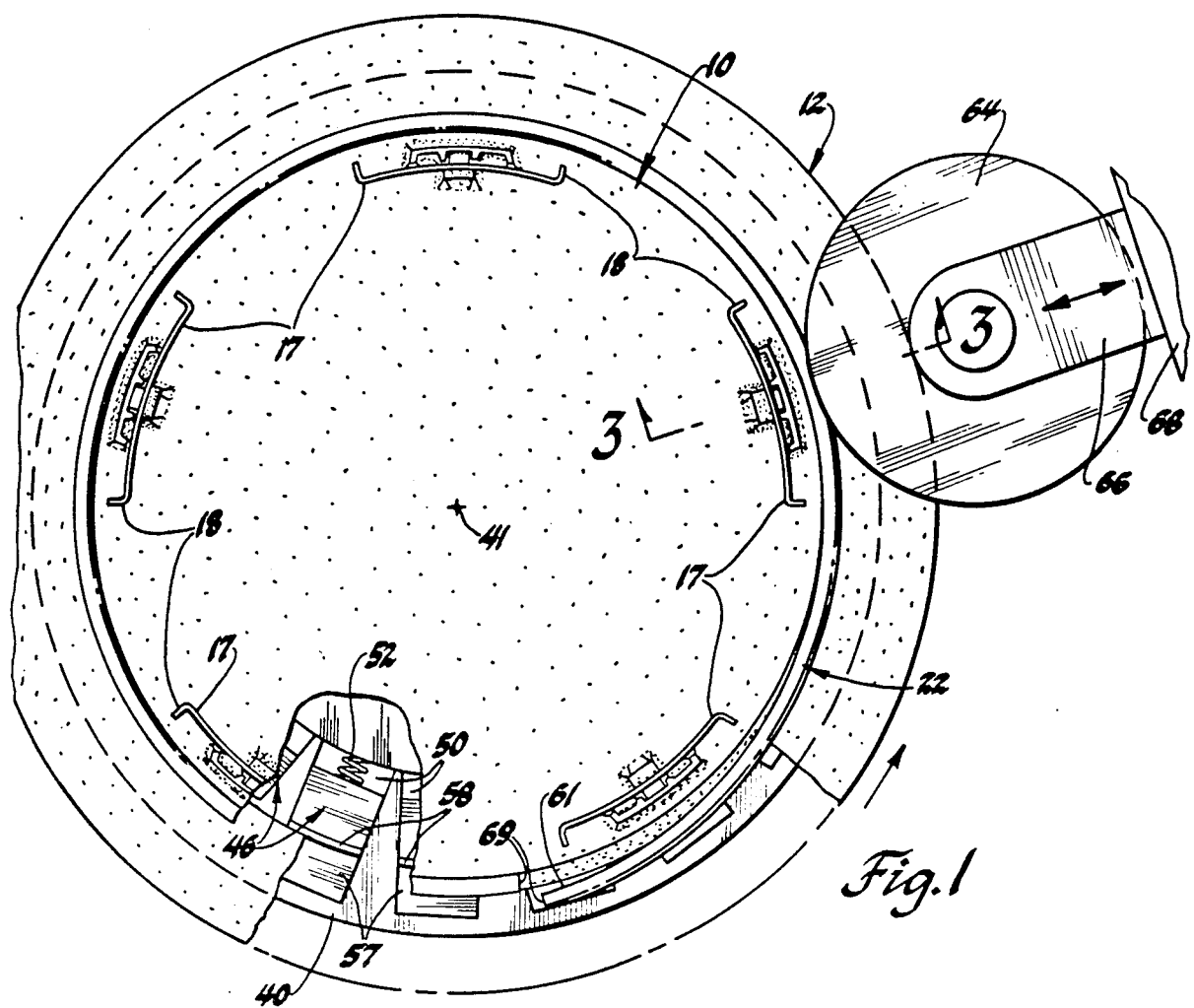
FIG. 1 is a plan view of the preferred form of apparatus according to the present invention as adapted to attaching a flexible edge to a motor vehicle wheel cover.
Figure 4:
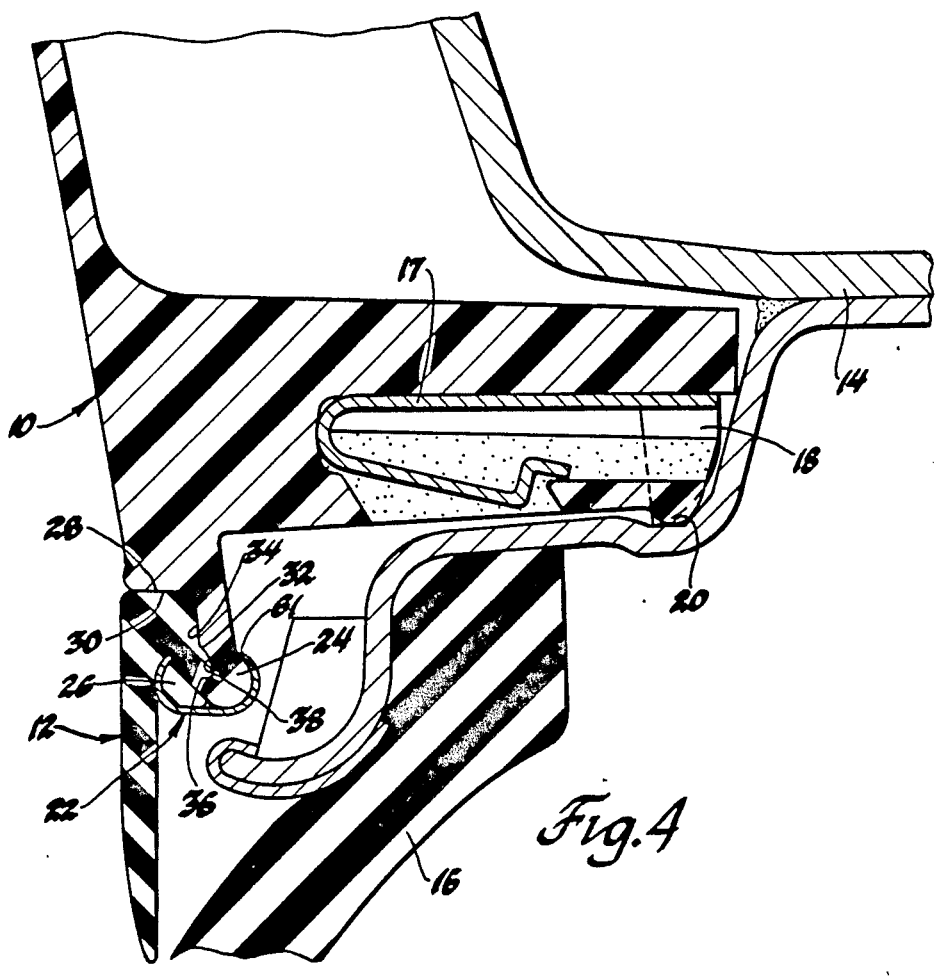
FIG. 4 is an enlarged partial sectional view showing the assembly of the attached flex edge and wheel cover to a vehicle wheel.

Referring to FIGS. 1 and 4, there is shown a wheel cover 10 of rigid plastic and circular shape to which a flex edge 12 of flexible plastic and annular shape is attached to the periphery thereof prior to the assembly of the wheel cover on a motor vehicle wheel 14. The purpose of the flex edge is to make the wheel cover appear larger in diameter yet be deflectable when the tire 16 that is mounted on the wheel is severely distorted such as by encountering bumps on cornering maneuvers. The wheel cover with the flex edge mounted thereon is attached to the wheel by a plurality of circumferentially spaced clip devices. These devices, as best seen in FIG. 4, include a metal spring 17 having barbs 18 that engage in a radially inwardly facing annular recess 20 in the exterior of the wheel rim to retain the cover on the wheel.

The flex edge is attached to the wheel cover by a split lock ring 22 of metal and C-shaped cross-section that must be received over and then clamps together an annular bead 24 on the wheel cover and a similar annular bead 26 on the flexible edge extending about the back side thereof. In addition, the flex edge has an inner diameter 28 that is received against a shoulder 30 on the wheel cover and in addition has a back side portion 32 that is received against a radially extending shoulder 34 on the wheel cover so as to align the front face of the flex edge with that of the wheel cover and in particularly make them flush at their juncture. Moreover, the flex edge bead 26 has an annular tongue 36 that must engage in an annular groove 38 in the bead on the wheel cover to further provide proper location of the flex edge on the wheel cover.

Figure 2:
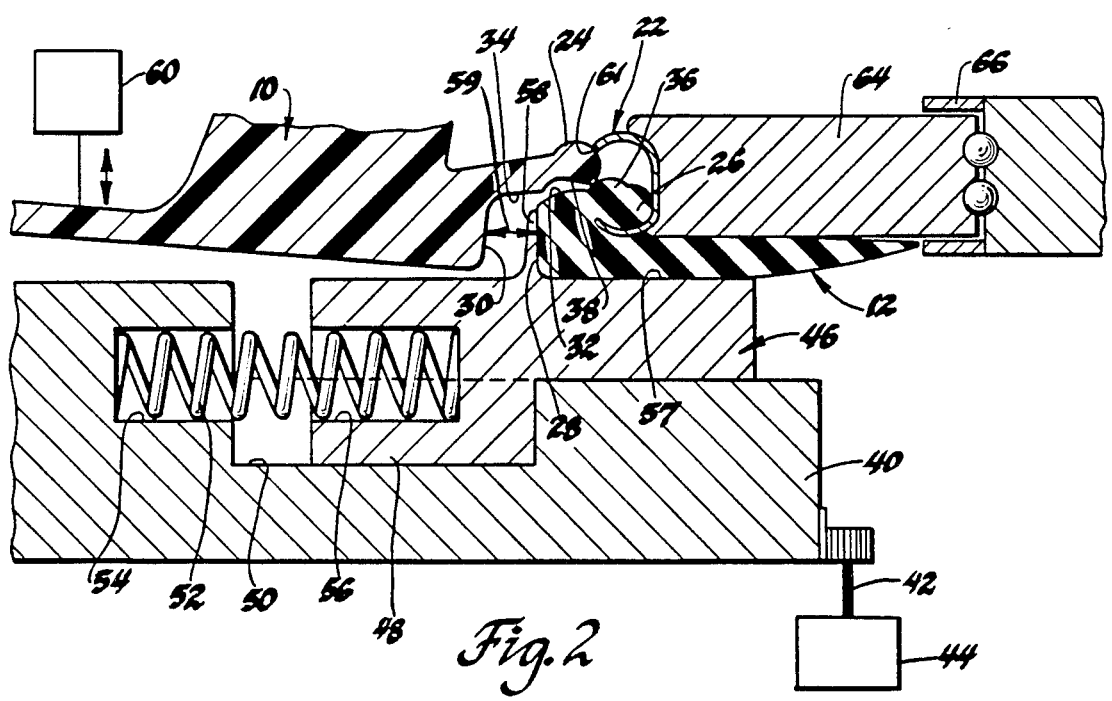
Figure 3:
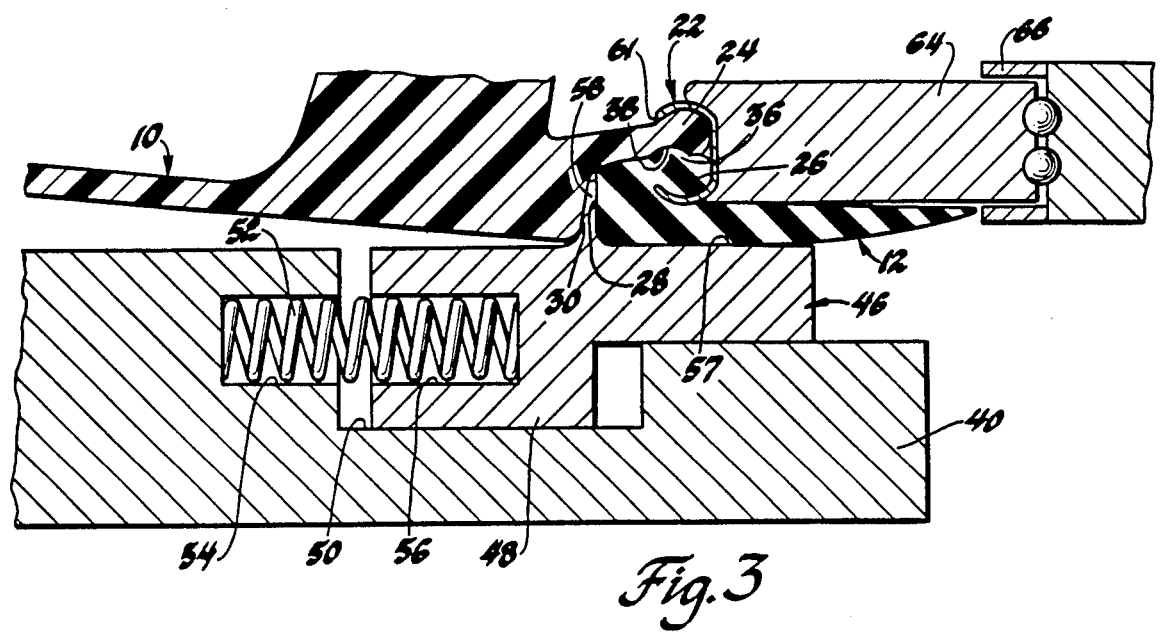
FIG. 3 shows an intermediate stage in the operation.

Apparatus according to the present invention for attaching the flexible annular member or edge to the rigid wheel cover member comprises a rotary table 40 that is driven about its axis 41 through a suitable drive train 42 by a motor 44. A plurality of support members 46 are annularly arranged on the table and each have a rectangularly-shaped guide portion 48 that is received in a complementaryly-shaped radial slot 50 in the top of the table so as to be guided thereby for radial movement on the table between a stop position shown in FIG. 2 and a lock ring assembly position shown in FIG. 3 as will be described in more detail later. A coil spring 52 is mounted in concentric counter bores 54 and 56 in the table and each support member respectively and operates to separately normally hold each support member in its stop position and resist radially inward movement to its lock ring assembly position. In addition, each support member has a flat support surface 57 on the top side thereof that is adapted to support the flexible annular member 12 with the lock ring 22 having been previously mounted thereon as shown in FIG. 2. Moreover, each of the support members has an upstanding locator 58 in the form of a thin upwardly axially extending shoulder against which the inner diameter 28 of the flex edge is stretched radially outward to fit against to thus locate the flex edge concentric with the rotary table and provide radial clearance 59 on the backside of the locators relative to the periphery of the wheel cover while the support members are all held in their stop position. And positioning means 60 such as an air cylinder is provided that is movable axially as shown by the double-headed arrow in FIG. 2 from a retracted position to the extended position shown to position the wheel cover 10 so that its bead 24 forcibly bears on its groove side against the tongue side of the bead 26 on the flex edge just radially inward of the location of the associated edge 61 of the lock ring as shown in FIG. 2.

A roller 64 is mounted on an arm 66 of an actuator 68 such as an air cylinder separate from the rotary table and is arranged so as to be radially movable relative to the rotary table as shown by the double-headed arrow in FIG. 1. The roller is movable from a retracted position (FIG. 2) to an extended position (see FIGS. 1 and 3) so as to slide along the back side of the flexible edge and engage the lock ring near one of the ends 69 thereof on the radially outwardly facing peripheral side (backside) of the lock ring and then move same radially inward on the associated support members against the associated springs. With such movement, this end of the lock ring is caused to snap over the bead on the wheel cover and thus over the bead on both the wheel cover and the flexible edge while also snapping the tongue 36 into the groove 38. The drive motor 44 is then activated to rotate the table in the direction of the arrow in FIG. 1 while the roller means is in its extended position engaging the lock ring to thereby cause the roller to roll along and thereby force the lock ring into position about both the beads along their length to complete such attachment. After the assembly the been completed, the wheel cover positioner and the lock ring roller are retracted to permit removal of the wheel cover with the flex edge thus attached by lifting same vertically upward off the locators 58. On removal, the flex edge returns to its original molded shape and the support members are returned under their spring load to their normal position shown in FIG. 2 in readiness to repeat the operation.

While the apparatus is shown as adapted to assemble a flex edge to a wheel cover, it will be understood by those skilled in the art that the apparatus is also adaptable to attaching other forms of flexible annular members and rigid members together using a similar lock ring and with or without an annular tongue and groove engagement between the beads clamped by the lock ring.

The above described preferred embodiment is thus intended to be illustrative of the invention which may be modified within the scope of the appended claims.

The embodiments of the invention in which an exclusive property or privilege is claimed are defined as follows:

1. Apparatus for attaching a flexible annular member to a rigid member using a preformed resilient lock ring that is split so as to have oppositely facing ends and has a C-shaped cross-section with a radially outwardly facing peripheral side so as to be mountable over and clamp together annular beads on the members, said apparatus comprising a rotary table, a plurality of support members annularly arranged on the table, guide means for separately guiding each support member for radial movement on the table between a stop position and a lock ring assembly position, spring means for separately normally holding each support member in its stop position and resisting radial movement to its lock ring assembly position, support means on each of said support members for supporting said flexible annular member with said lock ring mounted on the bead thereof on all of said support members while in their stop positions, locator means on each of said support members for locating said flexible annular member concentric with said rotary table and holding said flexible annular member in a radially stretched condition so as to receive said rigid member with radial clearance therebetween, positioning means for positioning said rigid member within said flexible annular member and so that the bead thereon forcibly bears against the bead on said flexible annular member while the latter member is located and supported on said support members, roller means mounted separate from and radially movable relative to said rotary table from a retracted position to an extended position to engage said lock ring near one of the ends thereof on said radially outwardly facing peripheral side and move same radially inward on the associated support members against the associated spring means so as to snap said one end over the bead on said rigid member and thus over the bead on both said rigid member and flexible annular member, and drive means for rotating said rotary table while said roller means is in its extended position engaging said lock ring to thereby cause said roller means to roll along and thereby force said lock ring into position about both said beads along their length to complete the attachment thereby.

2. Apparatus for attaching a flexible annular member such as a flexible edge to a rigid circular member such as a wheel cover using an annular tongue on one of two axially oppositely facing sides of an annular bead on one of the members that is engageable in an annular groove in one of two similar sides of an annular bead on the other member, said further using a preformed resilient lock ring that is split so as to have oppositely facing ends and has a C-shaped cross-section with a radially outwardly facing peripheral side so as to be mountable over the other bead sides and then clamp together and hold the annular beads on the members with their tongue and groove engaged, said apparatus comprising a rotary table, a plurality of support members annularly arranged on the table, guide means for separately guiding each support member for radial movement on the table between a stop position and a lock ring assembly position, spring means for separately normally holding each support member in its stop position and resisting radially inward movement to its lock ring assembly position, support means on each of said support members for supporting said flexible annular member with said lock ring mounted on the bead thereof on all of said support members while in their stop positions, locator means on each of said support members for locating said flexible annular member concentric with said rotary table and holding said flexible annular member in a radially outwardly stretched condition so as to centrally receive said rigid member with radial clearance therebetween, positioning means for positioning said rigid member within said flexible annular member and so that the bead thereon forcibly bears against the bead on said flexible annular member while the latter member is located and supported on said support members, roller means mounted separate from and radially movable relative to said rotary table from a retracted position to an extended position to engage said lock ring near one of the ends thereof on said radially outwardly facing peripheral side and move same radially inward on the associated support members against the associated springs means so as to snap said one end over the bead on said rigid member and thus over the bead on both said rigid member and flexible annular member while also snapping said tongue into said groove, and drive means for rotating said rotary table while said roller means is in its extended position engaging said lock ring to thereby cause said roller means to roll along and thereby force said lock ring into position about both said beads along their length and to complete the attachment thereby.

* * * * *